United States Patent [19]
Balsells

[11] Patent Number: 5,265,890
[45] Date of Patent: Nov. 30, 1993

[54] SEAL WITH SPRING ENERGIZER

[75] Inventor: Peter J. Balsells, P.O. Box 15092, Santa Ana, Calif. 92705

[73] Assignees: Peter J. Balsells; Joan C. Balsells, both of Santa Ana, Calif.

[21] Appl. No.: 620,724

[22] Filed: Dec. 3, 1990

[51] Int. Cl.⁵ .......................... F16T 15/32; F16T 9/06
[52] U.S. Cl. ..................... 277/163; 277/164; 277/205
[58] Field of Search .......... 277/163, 164, 205, 206 R; 267/1.5

[56] References Cited

U.S. PATENT DOCUMENTS

| | | | |
|---|---|---|---|
| 894,091 | 7/1908 | Williams | |
| 2,101,346 | 12/1937 | Robertson | 308/184 |
| 2,538,683 | 1/1951 | Guiler et al. | 285/163 |
| 2,797,937 | 7/1957 | Frishof | 285/105 |
| 2,814,540 | 11/1957 | Southerwick | 309/34 |
| 2,816,784 | 12/1957 | Stucke | |
| 2,819,063 | 1/1958 | Neidhart | 267/63 |
| 2,846,240 | 8/1958 | Beyer | 285/5 |
| 2,886,355 | 5/1959 | Wurzel | 287/52 |
| 2,957,717 | 10/1960 | Bram | 288/27 |
| 2,973,231 | 2/1961 | Reynolds | 309/33 |
| 2,999,707 | 9/1961 | Kniepkamp | 287/85 |
| 3,183,010 | 5/1965 | Bram | 277/235 |
| 3,223,426 | 12/1965 | Reid | 277/153 |
| 3,359,617 | 12/1967 | Baumler | 29/173 |
| 3,406,979 | 10/1968 | Weber | 277/164 |
| 3,561,776 | 2/1971 | Wilson | 277/206 R |
| 3,603,602 | 9/1971 | Padula | 277/164 |
| 3,653,670 | 4/1972 | Sifri et al. | 277/205 |
| 3,680,874 | 8/1972 | Schwarz | 277/205 |
| 3,698,727 | 10/1972 | Greenwald | 277/228 |
| 3,762,726 | 10/1973 | Jornhagen | 277/39 |
| 3,782,840 | 1/1974 | Brishka | 403/361 |
| 3,813,105 | 5/1974 | McQueen | 277/164 |
| 3,820,739 | 6/1974 | Graf | 242/46.4 |
| 3,847,389 | 11/1974 | Rogers | 277/153 |
| 3,890,072 | 6/1975 | Kaman | 287/53 |
| 3,910,566 | 10/1975 | Pedersen et al. | 267/167 |
| 4,067,407 | 1/1978 | Berg | 277/153 |
| 4,141,563 | 2/1979 | Wu | 277/164 |
| 4,143,883 | 3/1979 | Paynter | 277/164 |
| 4,172,599 | 10/1979 | Forch | 277/143 |
| 4,208,058 | 6/1980 | Wanner et al. | 277/153 |
| 4,244,192 | 1/1981 | Chelis | 62/6 |
| 4,304,409 | 12/1981 | Orlowski | 277/53 |
| 4,304,414 | 12/1981 | Forch | 277/153 |
| 4,379,558 | 4/1983 | Pippert | 277/164 |
| 4,426,086 | 1/1984 | Fournie et al. | 277/164 |
| 4,509,763 | 4/1985 | Fischer | 277/163 |
| 4,655,462 | 4/1987 | Balsells | 277/164 |
| 4,678,210 | 7/1987 | Balsells | 285/318 |
| 4,804,290 | 2/1989 | Balsells | 403/326 |
| 4,809,989 | 3/1989 | Kernal | 267/1.5 |

FOREIGN PATENT DOCUMENTS

| | | |
|---|---|---|
| 450392 | 10/1991 | European Pat. Off. |
| 490204 | 6/1992 | European Pat. Off. |
| 1234105 | 10/1964 | Fed. Rep. of Germany |
| 1930805 | 6/1969 | Fed. Rep. of Germany |
| 3331462 | 8/1983 | Fed. Rep. of Germany |
| 3438772 | 10/1984 | Fed. Rep. of Germany |
| 623170 | 5/1949 | United Kingdom |
| 742211 | 12/1955 | United Kingdom |
| 2083575 | 3/1982 | United Kingdom |
| 2169378 | 7/1986 | United Kingdom |

*Primary Examiner*—William A. Cuchlinski, Jr.
*Assistant Examiner*—D. DePumpo
*Attorney, Agent, or Firm*—Walter A. Hackler

[57] ABSTRACT

The seal apparatus includes a resilient member having at least one sealing surface thereon and an engagement surface spaced up from the sealing surface. A spring's position to bias the sealing surface and flexible or elastic means are disposed in and about the spring in order to substantially increase the useful life of the resilient member.

12 Claims, 5 Drawing Sheets

SEAL WITH SPRING ENERGIZER

The present application generally relates to seals for reciprocating and rotary applications and more particularly relates to seals which are loaded, or energized, by a spring.

Seals are generally formed from a resilient material and when disposed between adjacent surfaces are compressed to form a seal therebetween to prevent passage of fluids thereby. The inherent characteristics of the resilient material limit the load capability of seals made therefrom. Generally speaking, the deflection of a resilient seal results in a sealing force which is inconsistent over a range of deflection of the seal. This results in poor sealing capability when the resilient material is not sufficiently deflected and excessive wearing of the seal when it is subjected to greater deflection.

To overcome these characteristics, seals have been used in combination with springs, for example, canted coil springs which can be manufactured so that within a certain range of deflection thereof the force developed remains relatively constant. The advantages of these types of springs is pointed out in U.S. Patent No. 4,655,462 to Balsells.

When a canted coil spring is used in combination with a resilient material to form a seal, parameters such as the spring coil size, coil spacing, wire diameter, the angle the coils are canted with a centerline of the spring are, among others, used to tailor the resilient characteristics of the spring and the overall resilient characteristics of the seal to meet the needs of a proposed application.

Disclosed in copending U.S. patent application Ser. No. 496,329 is a combination of spring and elastic material which is disposed around and between a plurality of coils from modifying the force exerted by the spring in response to deflection of the spring along a loading direction. By specific reference thereto, this U.S. patent application is to be incorporated, including the specification and drawings, into the present application to set forth the types of spring assemblies suitable for use in the present invention.

It has been found that the use of spring assembly, including coil springs with a flexible material in and around the coils, provides a spring energizer assembly used in combination with a seal which surprisingly extends the useful life of the seal, despite the fact that the spring energizer makes no contact with the sealing surface, but rather, biases the resilient seal material from a spaced apart position from the sealing surface.

SUMMARY OF THE INVENTION

Sealing apparatus in accordance with the present invention generally includes a resilient member having at least one sealing surface thereon and including means defining a groove therein, with the groove being spaced apart from the sealing surface. A spring is disposed within the groove and flexible means, disposed in the groove with the spring, is provided for increasing the length of time that the sealing surface can effectively block the passage of fluid therepast when bearing against the surface moving relative thereto. This increased length of time is relative to the time that the sealing surface can effectively block the passage of fluid therepast when bearing against the surface moving relative therethrough when the flexible means is not present in the groove. Thus, the flexible means is effective in causing the life of the resilient ring member to be greater when the flexible means is disposed in the groove with the spring compared to the spring alone.

In one embodiment of the present invention, the flexible means is disposed in and around the spring and may have a hollow or a solid cross-section. In addition, the flexible means may be bonded or not bonded to the spring, but in either case, it is not bonded to the resilient member.

More particularly, the seal apparatus in accordance with the present invention may include a resilient ring member having at least one sealing surface thereon member adapted for bearing against a rotating and/or reciprocating surface in order to prevent passage of fluid therepast. The groove may be circumferential and the spring may include a plurality of coil means, interconnected with one another in a spaced-apart relationship, for causing the spring assembly to exert a force in a loading direction approximately normal to the sealing surface in response to the deflection of the spring assembly along the loading direction. The flexible means, disposed around and between the plurality of coil means, is operable for both modifying the force exerted by the spring assembly in response to the deflection of the spring assembly and for causing the life of the resilient ring member to be greater than the life of the resilient ring member when the flexible means are not present.

Another embodiment of the spring assembly may include a first plurality of coil means and a second plurality of coil means, the second plurality of coil means being disposed within the first plurality of coil means for causing the spring assembly to exert a generally constant force.

The flexible means may include a coating of flexible material on the spring and may be of sufficient thickness to extend the useful life of the seal by more than 300 percent. More particularly, the resilient member may comprise polytetrafluorethylene and the flexible material may be a silicone elastomer.

A method in accordance with the present invention for extending the useful life of a seal includes coating a spring with a flexible material and disposing the coated spring in a spaced-apart relationship with the sealing surface of the seal in a position for biasing the sealing surface against the sealing surface.

BRIEF DESCRIPTION OF THE DRAWINGS

A better understanding of the present invention may be had by consideration of the following detailed description, taken in conjunction with the accompanying drawings, in which.

DETAILED DESCRIPTION

Figure 1:
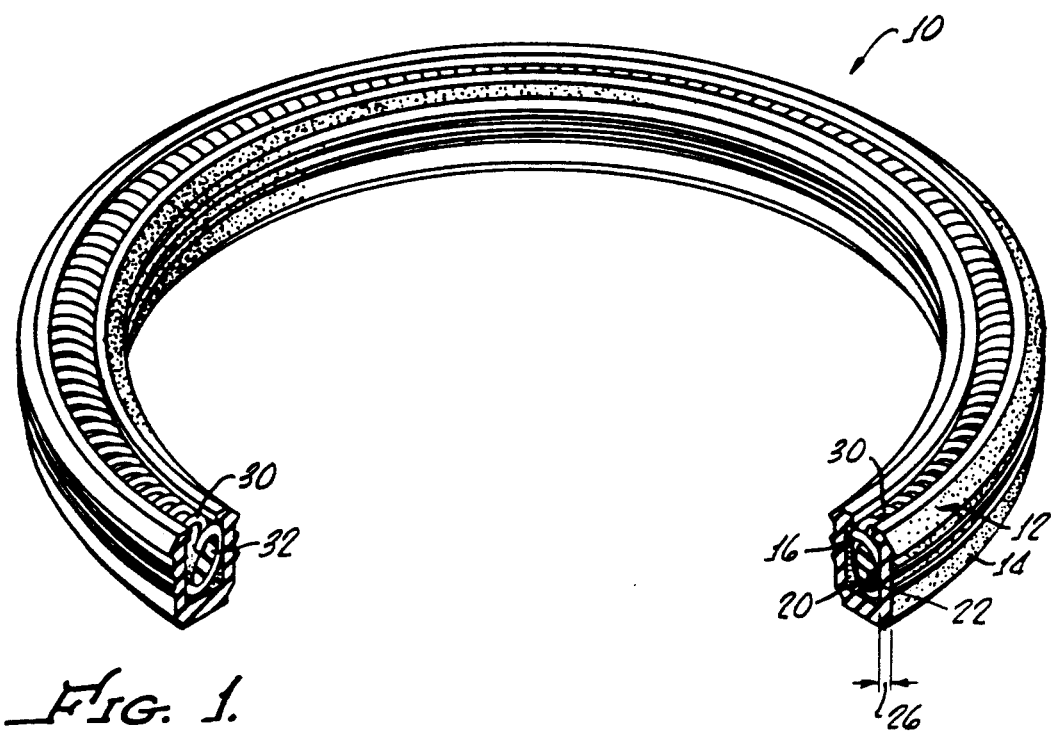
FIG. 1 is a perspective view of a radial type seal suitable for reciprocating applications, generally including a plurality of coils interconnected in a manner forming a radially resilient canted coil spring, with the spring being disposed in a groove with a flexible material.

Turning now to FIG. 1, there is shown seal apparatus 10 in accordance with the present invention generally showing a resilient member 12 having sealing surfaces 14, 16 and a shape defining a groove 20 which provides an engagement surface 22 which is spaced apart from the sealing surface 14 by a thin lip 26.

A canted-coil spring 30, as hereinafter described, is disposed within the groove 20 in position biasing the engagement surface 22. A flexible, or jelly-like material, 32, disposed around the spring 30 provides a means for increasing the length of time that the sealing surface of 22 can effectively block the passage of fluid (not shown) therepast when bearing against a surface (not shown) moving relative thereto to greater than the second length of time that the sealing surface 14 can effectively block the passage of fluid therepast when bearing against the surface moving relative thereto when the material 32 is not present in the groove 20, as will be described hereinafter in greater detail.

The combination of the material 32 with the spring substantially increases the usable life of the seal 10. The elastic, or jelly-like material 32, may be bonded to the spring or float around the spring cross-section without being attached to it. The material 32 can be an elastomer, plastic, paste, sealing caulk, grease, wax or any suitable material, but preferably a material such as silicone RTV 732, available from Dow Corning. It is believed that the material 32 effectively distributes the spring force and decreases dead volume, yet allows the spring to maintain a characteristic load deflection characteristic as will be hereinafter described in greater detail.

The combination of the present invention must be distinguished from that shown in Bram U.S. Pat. No. 3,183,010, in which an elastomer, bonded to a spring, is provided for the purpose of supporting the elastomer.

An alternative embodiment 40 of the present invention for use in axial loading applications includes a resilient member 42 having sealing surfaces 44 and 46 and a shape defining a groove 50 having an inside surface 52 separated from the sealing surface 44 by a thin lip 54. Similar to the embodiment 10 shown in FIG. 1, an elastic material 56 is disposed in the groove 50 for extending the useful life of the seal apparatus 40, as will be hereinafter described in greater detail.

While any number of springs may be used to advantage in the present invention, as hereinafter described, particularly suitable are canted coil springs such as described in copending U.S. patent application Ser. No. 496,329 filed on Mar. 20, 1990, which specification and drawings are incorporated herewith by specific reference thereto, in order to describe canted coil springs suitable for use in the present invention and additionally described placement of elastomer in and about such coil springs.

Figure 3:
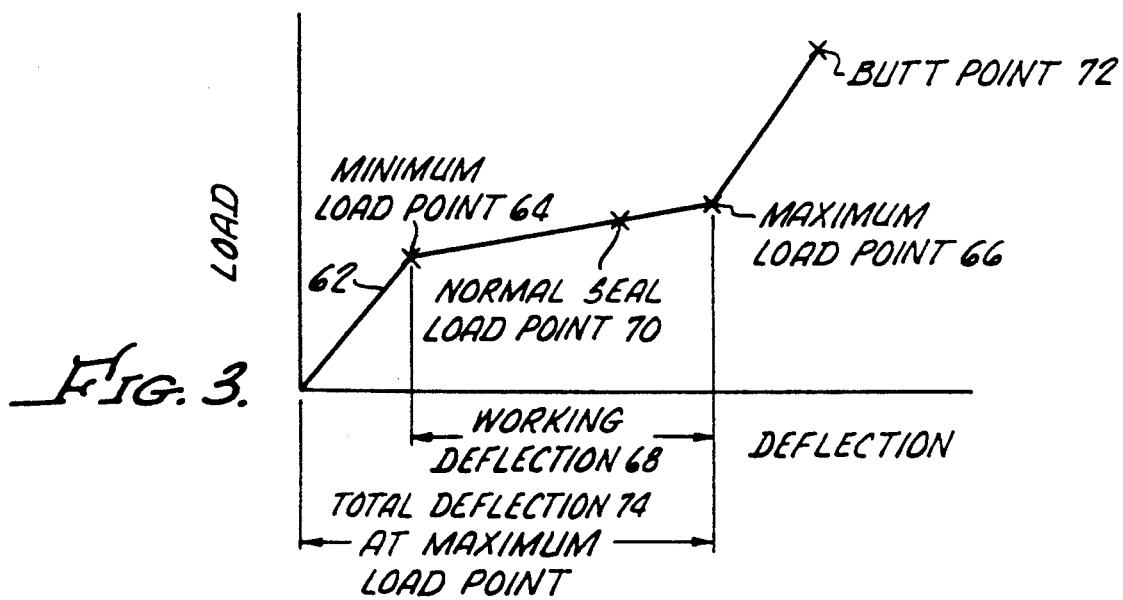
FIG. 3 is a load-deflection curve for a spring assembly in accordance with the present invention for the purpose of defining a nomenclature thereof.

FIG. 3 shows an exemplary load-deflection curve 60 for the purpose of illustrating the characteristics of canted coil resilient coil springs suitable for use in the seals 10, 40, in accordance with the present invention.

As shown in FIG. 3, when a load is applied to the spring 30, 58, the spring 30, 58 deflects in a generally linear fashion, as shown by the line segment 62, until it reaches a maximum load point 64 which represents the point at which, after the initial deflection, the load begins to remain relatively constant. It is to be appreciated that for an axially resilient spring 58, the load is applied axially and for a radially resilient spring 30, the load is applied radially.

Between the minimum load point 64 and a maximum load point 66, the load deflection curve may be constant or show a slight increase, as shown in FIG. 3. The area between the minimum load point 14 and the maximum load point 66 is known as the working deflection range 68. The spring 30, 58 is normally loaded for operation within this range, as indicated by a point 70. Loading of the spring 30, 58 beyond the maximum load point 66 results in an abrupt deflection response until it reaches a butt point 72, which results in a permanent set in the spring as a result of overloading. Also indicated in FIG. 3 is the total deflection range of 74, which is defined as the deflection between the unloaded spring and the maximum load point 66.

Turning to FIGS. 4a-g, there are shown various embodiments of the present invention suitable for dynamic applications. More specifically, the seal 80 includes a resilient member 82 with a groove 84 therein for containing a spring 86 with elastomer 88 having a hollow cross section, thereby producing a central void 90 therethrough. The elastic flexible material 88 may be of the type hereinabove described and the resilient member 82 may be of any suitable material, but preferably polytetrafluorethylene (PTFE) which may be filled or not filled, for example, with graphite, as commonly known.

Figure 4A:
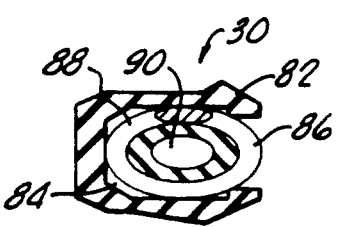
FIGS. 4a, b, c, d, e and g, show in cross-section a variety of spring assemblies utilizing canted-coil springs for a number of dynamic applications in accordance with the present invention.
Figure 4B:
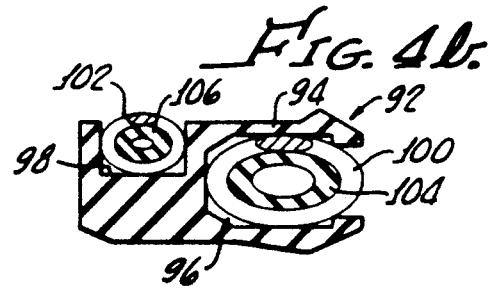

FIG. 4b shows a seal 92 having an elastic member 94 with two grooves 96, 98, for supporting springs 100, 102 with elastic material 104, 106 having a hollow cross section. The seal 92 is suitable for rotary, reciprocating and static applications and, in addition, the spring 102, and elastomer 106, provides a secondary holding means in order to provide added sealing ability and better gripping actions so as to reduce possible movement of the seal assembly 92 in dynamic applications, primarily in rotary and oscillating service.

Figure 4C:
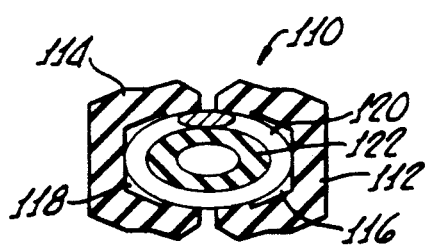
Figure 4D:
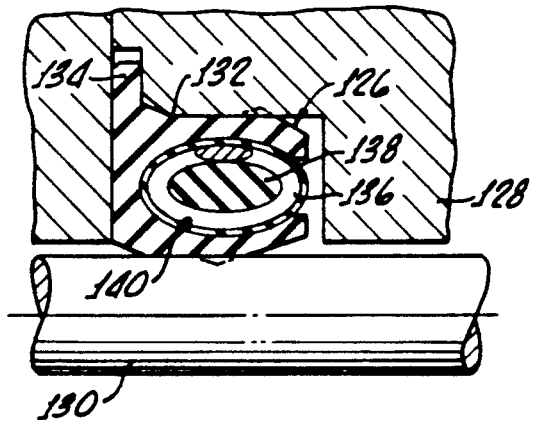

Turning to FIG. 4c, there is shown a seal apparatus 110 which includes two resilient members 112 and 114, each with grooves 116, 118 for supporting a spring 120 and elastic material 122 therein. A spring assembly 126, shown in FIG. 4d, mounted in a housing 128 for sealing against a shaft 130, includes a resilient member 132 having a flange 134 thereon for recording the seal in the dynamic application. As shown in FIG. 4d, a spring 136 is completely surrounded by the elastic material 138 within the groove 140 of the elastic member 132, the elastic material 138, having a solid or hollow (not shown) center.

Figure 4E:
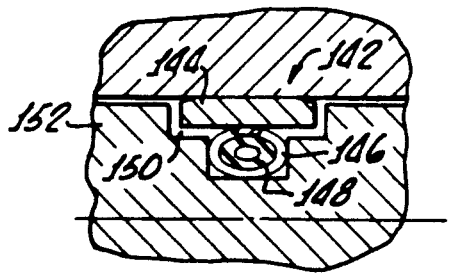

A dynamic seal apparatus 142 is shown in FIG. 4e which generally includes a resilient member 144, a spring 146 and the elastic material 148, all disposed within a groove 150 in the housing 152.

Figure 4F:
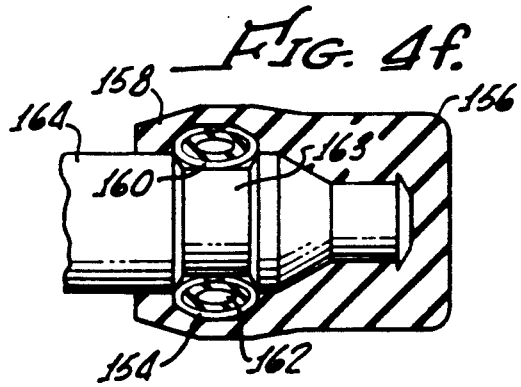

In another application in FIG. 4F, a spring assembly 154 is useful in a syringe 156 application in which the resilient material 158 supports the spring 160 and the elastic material 162 within a groove 163 to lock the resilient member 158 with a fitting 164.

Figure 4G:
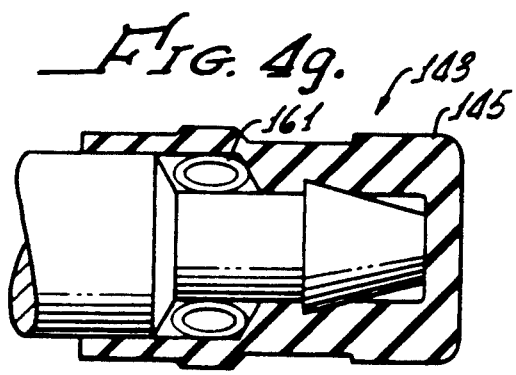

FIG. 4g, shows a seal apparatus 143 similar to that shown in FIG. 4f including a resilient member 145, and a spring 161 for applications involving a very small diameter.

Figure 5:
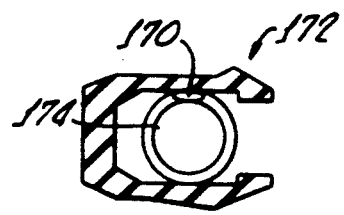
FIG. 5 shows a round spring filled with an elastomer having a hollow core in a seal assembly.
Figure 6A:
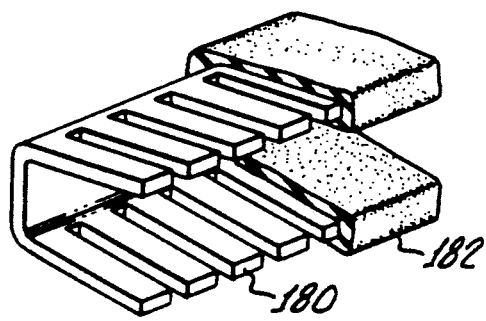
FIG. 6a and b shows an elastomer filled with V-shaped flat straight length of spring suitable for use with a resilient material for forming a spring assembly in accordance with the present invention.
Figure 6B:
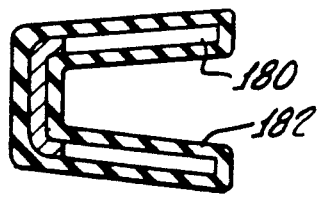

While the hereinabove embodiments of the present invention have been described in connection with a canted coil spring, other types of springs such as a round ribbon-type spring 170 may be utilized in a seal 172 with an elastomer, or plastic, 174 as shown in FIG. 5. Any number of spring configurations may be utilized, as for example, shown in FIGS. 6a and b in which a flat U or V-shaped spring 180 with an elastomer 182 disposed therearound. Thereafter, the spring 180 and elastomer 182 may be disposed in any suitable resilient material (not shown) for sealing in accordance with the present invention.

Figure 2:
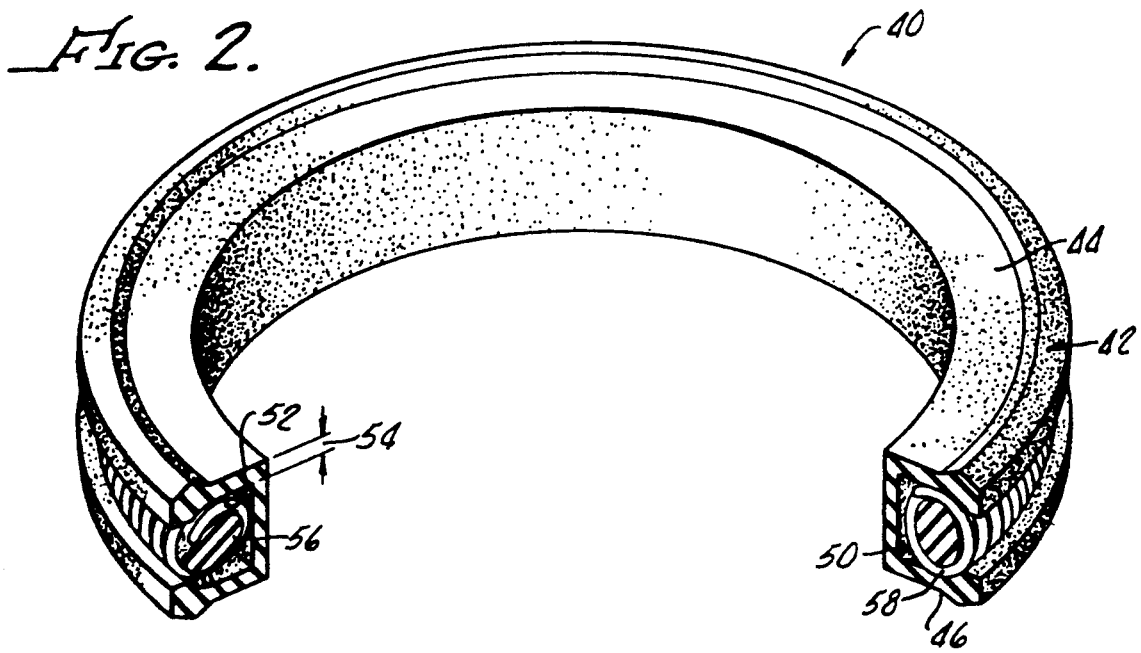
FIG. 2 is a perspective view of an axial type seal in accordance with the present invention generally including a resilient member and a spring including a plurality of coils interconnected in a manner forming a garter-type axially resilient coil spring disposed in a groove along with a flexible material.
Figure 7:
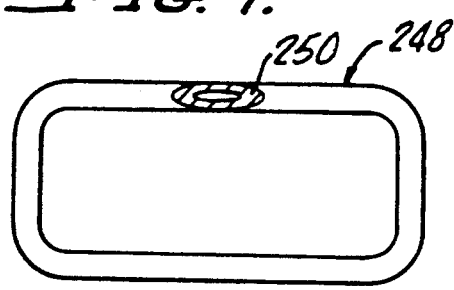
FIG. 7 shows an axial spring with an irregular shape and filled with an elastic material having a hollow cross-section in accordance with the present invention.

While the spring assemblies 10, 40 shown in FIGS. 1 and 2 have a generally circular shape, it should be appreciated that any irregular shapes, such as the spring assembly 248 shown in FIG. 7, may be utilized which includes an elastic material 250 having a solid, or hollow cross section. If the elastic material chosen is supporting, contrasted to a jell-like material, the springs 30, 58 may be filled by any manufacturing method suitable for the elastomer employed, such methods including extrusion, molding, spring or any other suitable method for introducing the elastomer, or plastic, 32, 56 in and around the spring 30, 58, either filling or leaving a hollow cross-section.

Figure 8:
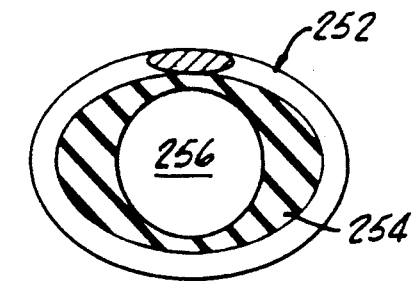
FIGS. 8-10 show various inter cross-sectional configurations in accordance with the present invention.
Figure 9:
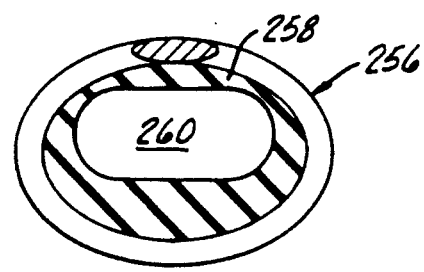
Figure 10:
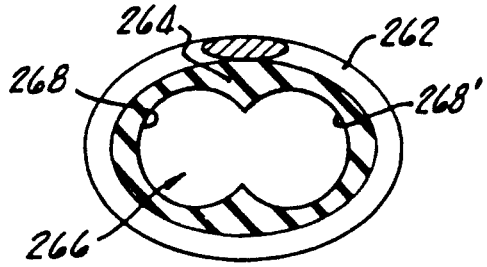

Various embodiments of the present invention are shown in FIGS. 8 through 12. In FIG. 8, coils 252 with an interior elastomer 254 are shown with the coils 252 having an elliptical shape and the elastomer 254 having a circular shaped void 256 therethrough. FIG. 9 shows elliptically shaped coils 256 having an elastomer 258 with an offset, or generally rectangular, hollowed cross-sectional opening 260 therethrough, while FIG. 10 shows an elliptically shaped coils 262 having an elastomer 264 with an irregularly shaped opening 266 comprising to generally circular cross-sectional areas 268, 268'.

Figure 11:
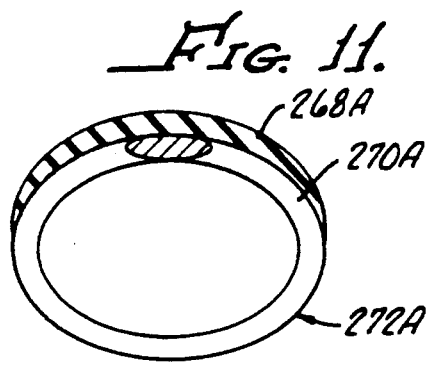
FIG. 11 shows a spring with a partially filled elastomeric material protruding beyond the coil along one area of the miner axis of the spring and all around and between the coil, which can be encapsulated or coated.

The elastic material may be disposed within the coils 252, 256, 262 as shown in FIGS. 8, 9 and 10 or, alternatively, as shown in FIG. 11, an elastomer 268A may be disposed on one side 270A of coils 272A. This embodiment is most useful in applications in which a greater distribution of the load is desirable on the one side 270A of the coils 272A.

Figure 12:
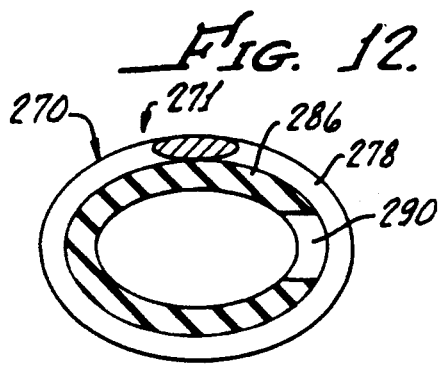
FIGS. 12, 14 show variations and encapsulation of coils of the present invention with an elastomer or plastic.
Figure 13:
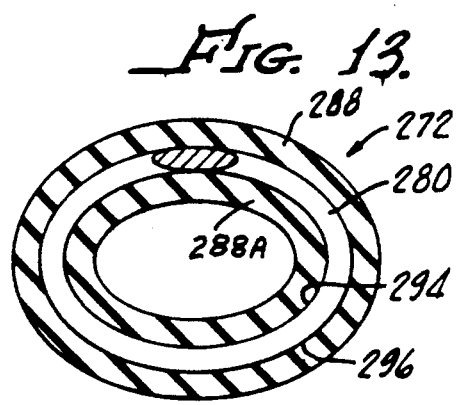
Figure 14:
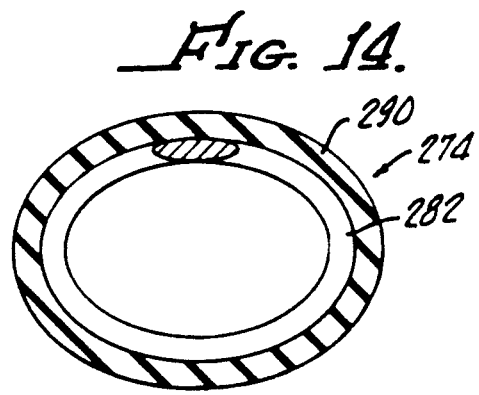

Other embodiments 270, 272, 274 of the present invention, shown respectively in FIGS. 12 through 14, said embodiments 271, 272, 274 including coils 278, 280, 282 and elastomers 286, 288, 290. The embodiment 270 includes an open area 290 through the coils 278 in order to facilitate the passage of fluid (not shown) for pressure variation cooling or lubrication purposes.

As can be seen from FIG. 13, the elastomer 288 may be disposed as a coating, both the inside 294 and outside 296 of the coil 280, while FIG. 14 shows the elastomer 290 disposed along the outside and through the coils 282. All of these embodiments differently affect the force-deflection characteristics of the embodiments 271, 272, 274, depending upon the application of the embodiment 271, 272, 274.

The ability to maintain a relatively constant force within a certain deflection is affected by a number of parameters, all of which are taken into consideration, which include the cross-section of the elastomer and the disposition thereon as indicated in FIGS. 8 through 14, the thickness of the elastomer, the position of the elastomer, or plastic, relative to the coils, the flexibility of the elastomer, the degree of bonding between the coils 252, 256, 262, 270A, 278, 280, 282 and corresponding elastomers 254, 256, 264, 268A, 286, 288, 288A, 290, the spacing between the coils 252, 256, 262, 270A, 278, 280, 282, the wire diameter, coil height and coil width, among other considerations.

Figure 15A:
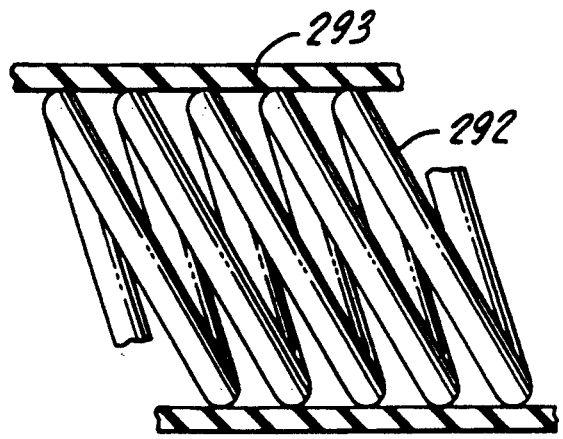
FIGS. 15a, b, c are cross section views of a spring and elastomer showing relative positions of the elastomer with respect to coils of the spring.
Figure 15B:
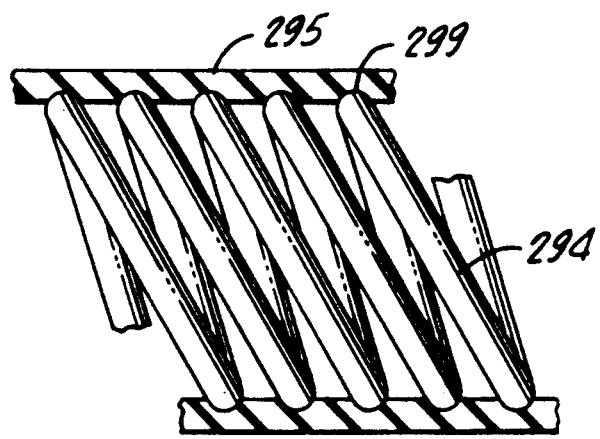
Figure 15C:
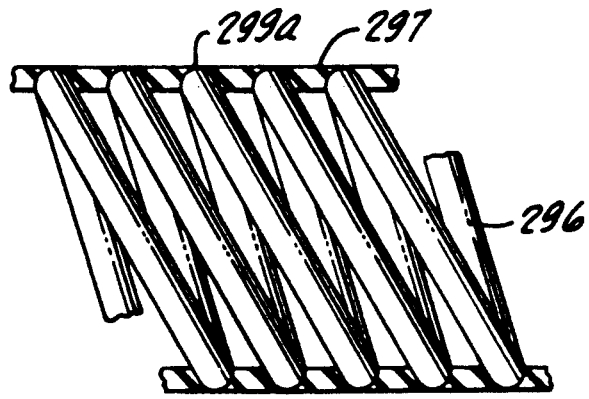

The various positions of the elastomer, or plastic, relative to the coils is illustrated in the FIGS. 15a, b and c, showing the coils 292, 294, 296, and respectively, the elastomers 293, 295 and 297. As shown in FIG. 15a, the elastomer 293 is in the form of a tube in which the coils 292 are inserted. Alternatively, the elastomer, or plastic material, 293 could be molded or extruded upon the coils 292. In this embodiment the elastomer, or plastic material, 293, does not significantly enter spaces between the coils 292. As shown in FIG. 15b, the elastomer 295 partially fills the spaces between the coils 294 so that the elastomer, or plastic, 295 covers the outer portion of the coil 294 and between the coils 294 to a point below the top 299 of the coil. The depth of the elastomer, or plastic, 295 between the coils controls the force developed by the coils 294. Alternatively, as shown in FIG. 15c, the elastomer, or plastic, 297, is flush with the outside 299a of the coil 296, but extends partially between the coils 296 and of course around them. In this embodiment, the depth of the elastomer, or plastic, 297 from the surface 299a inwardly between the coils 296 determines the degree of flexibility of the coil.

It is to be appreciated that when a canted-coil spring is filled with an elastomer, especially in an outer portion of the coil, the force applied thereon is transmitted more uniformly and the stress acting on the mating parts is substantially lower.

It has been unexpectedly found that the combination of the elastic or flexible material 32, 56, with the spring 30 and 56 within the resilient material 12, 42, results in a sealed life substantially longer than when the spring 30, 58 is utilized within the resilient member 12, 42 without the elastic material 32, 56 present.

These results occur when the resilient member 12, 42 is formed of elastic-type material such as silicone, plastic, fluorosilicones, PTFE, elastomers, either bonded or not bonded, to the spring 30, 58. In addition, jelly-like materials such as paste and sealants, caulks and greases, waxes, may be utilized.

As set forth in U.S. patent application Ser. No. 496,329, force developed by the spring 30, 58, filled with an elastomer material 32, 56 results in a force which is substantially higher than the spring alone. In this instance, a spring with a smaller diameter may be utilized which permits more coil springs and therefore better distribution of a load.

As shown in FIG. 4f, embodiments of the present invention used in a locking/holding embodiment 154, the elastomer may further act to reduce possible rotation of the spring 160. In this instance, the spring 160 may be filled with a material that has a high coefficient friction to reduce the possibility of movement. This material may be of polyurethane elastomer which has a high friction or a high temperature plastic such as polyphelene sulfide (POPS), poly-ether ketone (PEEK).

A series of tests conducted confirm the increased life of seals 10, 132 utilizing a resilient material 32, 138 comprising PTFE and an elastomer with a hollow cross section formed of Dow Corning RTV 732. The specifications of the test as well as the seal utilized are shown in Tables 1 and 2 for the identical resilient member 12, 132 and spring 30, 136 without elastic material 32, 138 as a control, and with the elastic material present and either bonded to the spring 30, 136 or not bonded with the spring 30, 136.

Bonding of the elastic material 32, 138 to the spring 30, 136 may be controlled in any known conventional manner such as by etching the wire spring and priming it prior to application of the elastic material, or not priming the spring and applying a release material so that non-bonding between the elastic material 32, 138 with the springs 30, 136 do not occur.

Table 1 shows the test comparison utilizing a reciprocating shaft and the seal 10, while Table 2 shows the results of a rotating test comparison for the seal 10.

TABLE 1
RECIPROCATING TEST COMPARISON

Comparison Seal Performance with Different Spring Energizers

A) Canted Coil Spring
B) Canted Coil Spring - Primed and Filled with Elastomer with Hollow Cross-Section (Elastomer Bonded to Spring)
C) Canted Coil Spring - Filled with Elastomer with Hollow Cross-Section (No Bonding of Elastomer to Spring)

| Test Conditions | Type of Spring Energizer | | |
|---|---|---|---|
| | A | B | C |
| | AVERAGE OF THREE TESTS | | |
| Speed | 300 CPM | → | → |
| Stroke | 1.312 Inches | → | → |
| Pressure | 4000 PSI | → | → |
| Shaft Dia. | .125 In. | → | → |
| Shaft Material | Stainless Steel 302 | → | → |
| Hardness | Rc 28 | → | → |
| Surface Finish | 6 Ra | → | → |
| Cycles AT Observed Leakage | 11.500 | 32.210 cycles | 40.270 cycles |
| Seal Rating | 1.0 | 2.80 | 3.50 |
| Seal Material | Reinforced Graphite PTFE | | |
| Seal Inside Dia. | .125 In. | → | → |
| Seal Outside Dia. | .250 In. | → | → |
| Type of Seal | U Cup-Spring Energized | → | → |

Comments:
(1) Spring Filled With A Silicone Elastomer Provides Substantially Greater Reliability than Primed Spring and Plain Canted Spring.
(2) Elastomer: Dow Corning RTV 732.

TABLE 2
ROTATING TEST COMPARISON

Comparison Seal Performance with Different Spring Energizers

A) Canted Coil Spring
B) Canted Coil Spring - Primed and Filled with Elastomer with Hollow Cross-Section (Elastomer Bonded to Spring)
C) Canted Coil Spring - Filled with Elastomer - Hollow Cross-Section (No Bonding of Elastomer to Spring)

| Test Conditions | Type of Spring Energizer | | |
|---|---|---|---|
| | A | B | C |
| | AVERAGE OF THREE TESTS | | |
| Speed | 1405 RPM | → | → |
| Pressure | 100 PSI | → | → |
| Shaft Dia. | .625 In. | → | → |
| Media | Nitrogen Gas | → | → |
| Temperature | 75° F. | → | → |
| Shaft Material | Stainless Steel | → | → |
| Hardness | Rc 41 | → | → |
| Surface Finish | 4 Ra | → | → |
| Time at Measured Leakage | (9) Hrs | (28) Hrs | (39) Hrs |
| Leakage Rate | 1 cc/Min. | 1 cc/Min. | 1 cc/Min. |
| Seal Rating | 1 | 3.1 | 4.3 |
| Seal Material | PTFE - Graphite Fiber | | |
| Seal Inside Dia. | 0.625 Dia. | → | → |
| Seal Outside Dia. | | | |
| Type of Seal | U Cup-Spring Energized | → | → |

Comments:
(1) Spring Filled with a Silicone Elastomer Provides Substantially Greater Reliability than Primed spring and Plain Canted Spring.
(2) Elastomer: Dow Corning RTV 732.

It can be seen that without change of the resilient member 12 or its sealing surfaces 14, 16 that the internal biasing of the combined spring 30 and elastic material 32 cause the life of the spring to be 2.8 times the life of the spring without the elastomer when the elastomer is bonded to the spring and three and one-half times the life when the elastomer is not bonded to the spring. This increase in life is truly unexpected.

Similarly, in the rotating test, the seal 92 with the bonded elastomer spring had a life of 3.1 times the spring elastic member alone and 4.3 times the life of the spring and resilient member alone when the elastomer is not bonded to the spring.

Figure 16A:
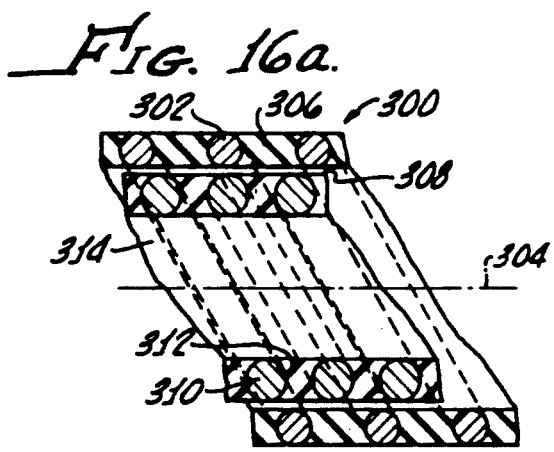
FIGS. 16a and b are views of an alternative embodiment of the present invention with a spring assembly having a first and second plurality of coil means canted in the same direction along a common centerline and separated from one another.

Turning to FIGS. 16a and b, there is an alternate embodiment of a spring assembly 300 which includes a first plurality of coils 302 interconnected with another in a spaced-apart relationship for causing the spring assembly 300 to exert a generally constant force in a loading direction normal to a tangent to a centerline 304. As herinbefore described in connection with the plurality of coils 302, an elastic material 306 is disposed around and between the plurality of coils 302 a hollow cross section 308 which provides means for modifying the force exerted by the spring 302 assembly 300 in a response to deflection of the spring assembly 300 along a loading direction as herinbefore described.

Disposed within the plurality of coils 302 is a second plurality of coils 310 interconnected with one another in a spaced apart relationship and disposed in a cooperating relationship inside the first plurality of coils for causing the spring assembly 300 to exert a generally constant force in a loading direction approximately normal to the centerline 304.

Figure 16B:
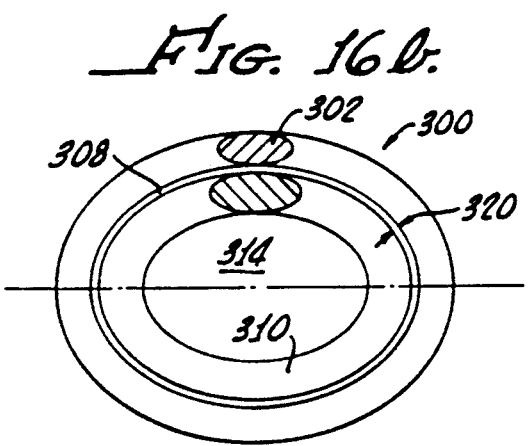

An elastic material 312 disposed around and between the plurality of coils 310 and includes a hollow cross section 314. FIG. 16b shows a cross sectional view of the spring assembly 300 and also showing that the elastic materials 306, 312 may be separate from one another with a gap 320 therebetween to allow relative movement therebetween as the spring assembly 300 is loaded.

Figure 17A:
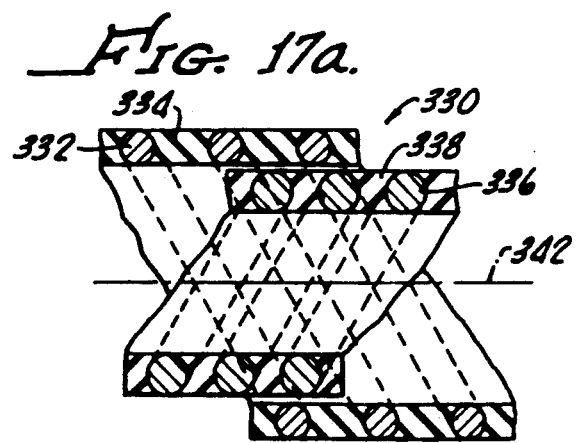
FIGS. 17a and b show an alternative embodiment of the present invention in which the first and second plurality of coil means are canted in opposite directions.
Figure 17B:
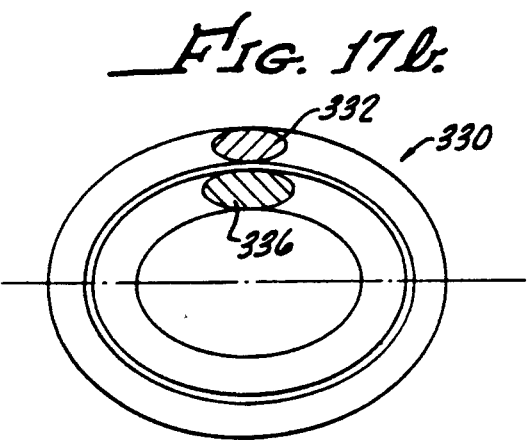

Similar to the spring assembly 300, a spring assembly 330 shown in FIGS. 17a and b include a first plurality of coils 332 with an elastic material 334 disposed therearound and a second plurality of coils 336 within the elastic material 338 therearound. The configuration of the first and second plurality of coils 332, 336 and elastic material 334, 338 is similar to the coil assembly 300 shown in FIGS. 16a and b except that the first plurality of coils 332 is canted in an opposite direction from the second plurality of coils 336 along a centerline 342. The performance of the embodiments shown in FIGS. 16a and b and 17a and b are similar to that hereinbefore described in connection with the spring assembly 10 further extending the design range capability of the forced deflection curves thereof.

Although there has been herinabove described a specific arrangement of a seal apparatus in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the invention as defined in the appended claims.

What is claimed is:

1. Seal apparatus comprising:
   a resilient member having at least one sealing surface thereon and means defining a groove, said groove being spaced apart from said sealing surface;
   a spring disposed within the groove in a position biasing said engagement surface; and
   flexible means, disposed in and around said spring, for increasing a length of time that the sealing surface can effectively block the passage of fluid when bearing against a moving surface, said length of time being greater than a second length of time that the sealing surface can effectively block the passage of fluid when bearing against the moving surface when the flexible means is not present in the groove, said flexible means not being bonded to said resilient member and having a hollow cross section.

2. The seal apparatus according to claim 1 wherein said flexible means is bonded to the spring.

3. The seal apparatus according to claim 2 wherein said spring comprises a canted coil spring.

4. The seal apparatus according to claim 4 wherein said spring comprises a canted coil spring.

5. Seal apparatus comprising:
   a resilient ring member having at least one sealing surface thereon adapted for bearing against a rotating and reciprocating surface in order to prevent passage of fluid, said resilient ring member including means defining a circumferential groove therein, said groove being spaced apart from said sealing surface;
   a canted coil spring disposed in said groove; and
   flexible means, disposed in said groove, for causing a life of the resilient ring member to be greater than a second life of the resilient ring member when the flexible means is not disposed in said groove, said life and second life being determined by a measurement of an amount of fluid leakage past the sealing surface; said flexible means not being bonded to said resilient member.

6. The seal apparatus according to claim 5 wherein the flexible means is disposed in and around the spring and has a solid cross section.

7. The seal apparatus according to claim 5 wherein the flexible means is disposed in and around the spring and has a hollow cross section.

8. The seal apparatus according to claim 6 or 7 wherein said flexible means is bonded to the spring.

9. The seal apparatus according to claim 6 or 7 wherein said flexible means is not bonded to the spring.

10. Seal apparatus comprising:
    a resilient member having at least one sealing surface thereon and including means for supporting a spring in a spaced-part relationship with said sealing surface;
    a spring supplied by said resilient member; and
    a coating of flexible material deposited on said spring, said coating not being bonded to said resilient member.

11. The seal apparatus of claim 10 wherein said flexible material is not bonded to the spring.

12. The seal apparatus according to claim 10 or 11 wherein said resilient member comprises polytetrafluoroethylene and said flexible material comprises a silicone elastomer.

* * * * *